H. D. HARADEN.
LIFTING-JACK.

No. 171,126.

2 Sheets—Sheet 1.

Patented Dec. 14, 1875.

WITNESSES
George E. Upham.
Walter C. Mas[i]

INVENTOR
Harvey D. Haraden,
Chipman & [Osmer] & Co,
ATTORNEYS

2 Sheets—Sheet 2.

H. D. HARADEN.
LIFTING-JACK.

No. 171,126. Patented Dec. 14, 1875.

WITNESSES
George E. Upham.
Walter C. Mason.

INVENTOR
Harvey D. Haraden,
Chipman Hosmer & Co,
ATTORNEYS

UNITED STATES PATENT OFFICE.

HARVEY D. HARADEN, OF HARTFORD, VERMONT, ASSIGNOR OF ONE-HALF HIS RIGHT TO CARLOS S. HAMILTON, OF SAME PLACE.

IMPROVEMENT IN LIFTING-JACKS.

Specification forming part of Letters Patent No. 171,126, dated December 14, 1875; application filed July 24, 1875.

*To all whom it may concern:*

Be it known that I, HARVEY D. HARADEN, of Hartford, in the county of Windsor and State of Vermont, have invented a new and valuable Improvement in Carriage-Jacks; and I do hereby declare that the following is a full, clear, and exact description of the construction and operation of the same, reference being had to the annexed drawings making a part of this specification, and to the letters and figures of reference marked thereon.

Figure 1:
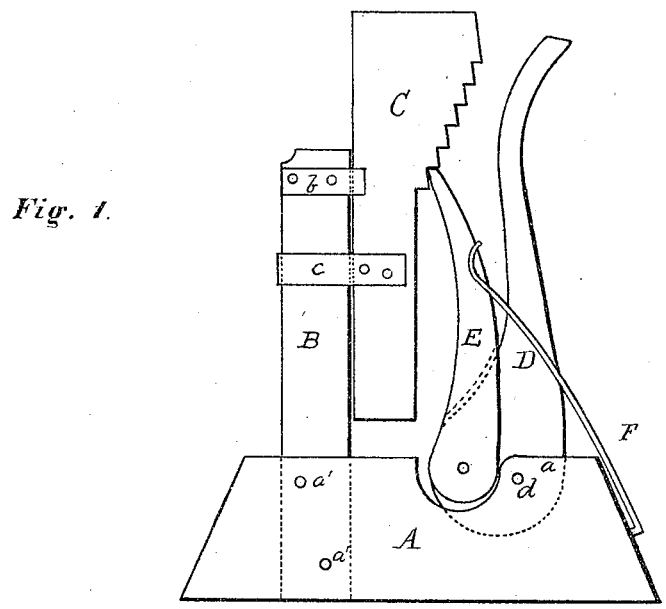
Figure 2:
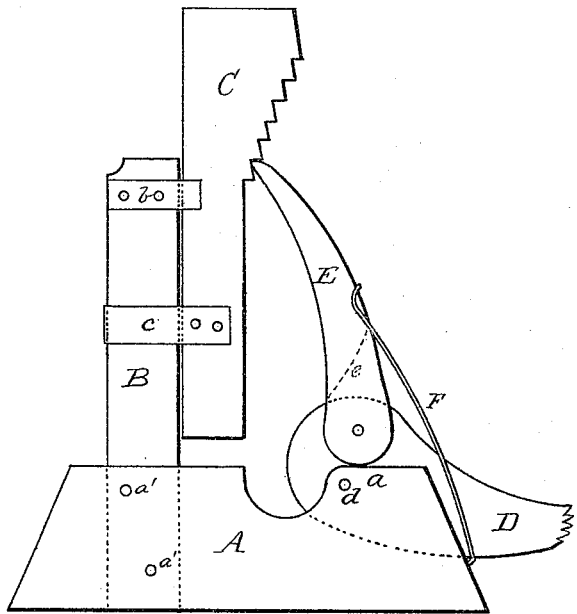
Figure 3:
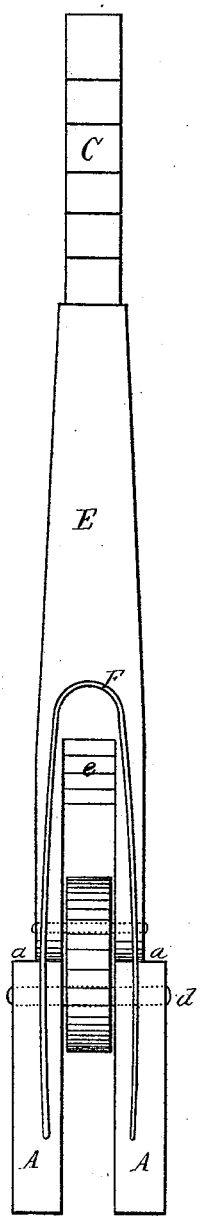

Figures 1 and 2 of the drawings are representations of side elevations of my carriage-jack; and Fig. 3 is a plan view, part sectional, of the same.

This invention has relation to improvements in jacks which are particularly adapted for lifting carriages; and it consists in the construction and novel arrangement of the ratchet-bar and its engaging-dog, a lever, a spring, and a ledge-bearing for the end of the dog, all constructed and arranged as hereinafter fully shown and described.

In the annexed drawings, the letter A represents the base-boards, each of which is provided with the convex-shaped shoulder or support $a$, which corresponds in form with the curve of motion of the end of the dog. The letter B represents a stationary upright bar bolted permanently to the base-boards, as shown at $a'$ $a'$, in the slot between the same. This bar or post is provided near its top with guiding-plates $b$ bolted thereon, the inner edges of which extend inwardly a little beyond said bar, in order to serve as a guide to a ratchet-bar, which I designate by the letter C. This bar is provided near its center with a loop, $c$, which is passed around the stationary bar B and bolted securely to the said bar C. In this manner the bar is allowed to have free motion up and down, and at the same time is prevented from being displaced.

D represents the operating-lever, pivoted, by means of a bolt, $d$, to the base-blocks A below the supporting-ledges $a$. To the upper margin of the enlarged end of the lever D is pivoted a dog, E, the lower enlarged end of which is slotted to admit the edge of the cam-lever D, which is bolted therein, as shown at $e$. Immediately in the rear of dog E is provided a pressure-spring, F, securely fastened at its lower ends in the support A. This spring is intended to fit closely up against the dog, so that when the lever is pushed down it will force the dog into the notches on the ratchet-bar.

It will be seen that when the lever is forced down the strain upon the bolts $d\,e$ is relieved, the dog being made to move and rest on the support or shoulder $a$, so that it is not liable to be broken or get out of order on account of weakness in the connections.

I am aware that a carriage-jack having a ratchet-bar, lever, dog, and pressure-spring is not new, and I therefore lay no claim to such invention, broadly; but

What I claim as new, and desire to secure by Letters Patent, is—

The combination of the sliding lifting-bar C, provided with a ratchet and operated by a spring-pawl, E, pivoted to the bottom of the hand-lever, fulcrumed in the base-block A, which is recessed to receive the end of the pawl, and divided to provide for the movements of the lever, substantially as shown and set forth.

In testimony that I claim the above I have hereunto subscribed my name in the presence of two witnesses.

HARVEY D. HARADEN.

Witnesses:
M. R. CONE,
LUTHER PEASE.